Feb. 1, 1949.   T. L. FAWICK   2,460,630
MULTICUSHIONED GEAR
Filed April 12, 1945
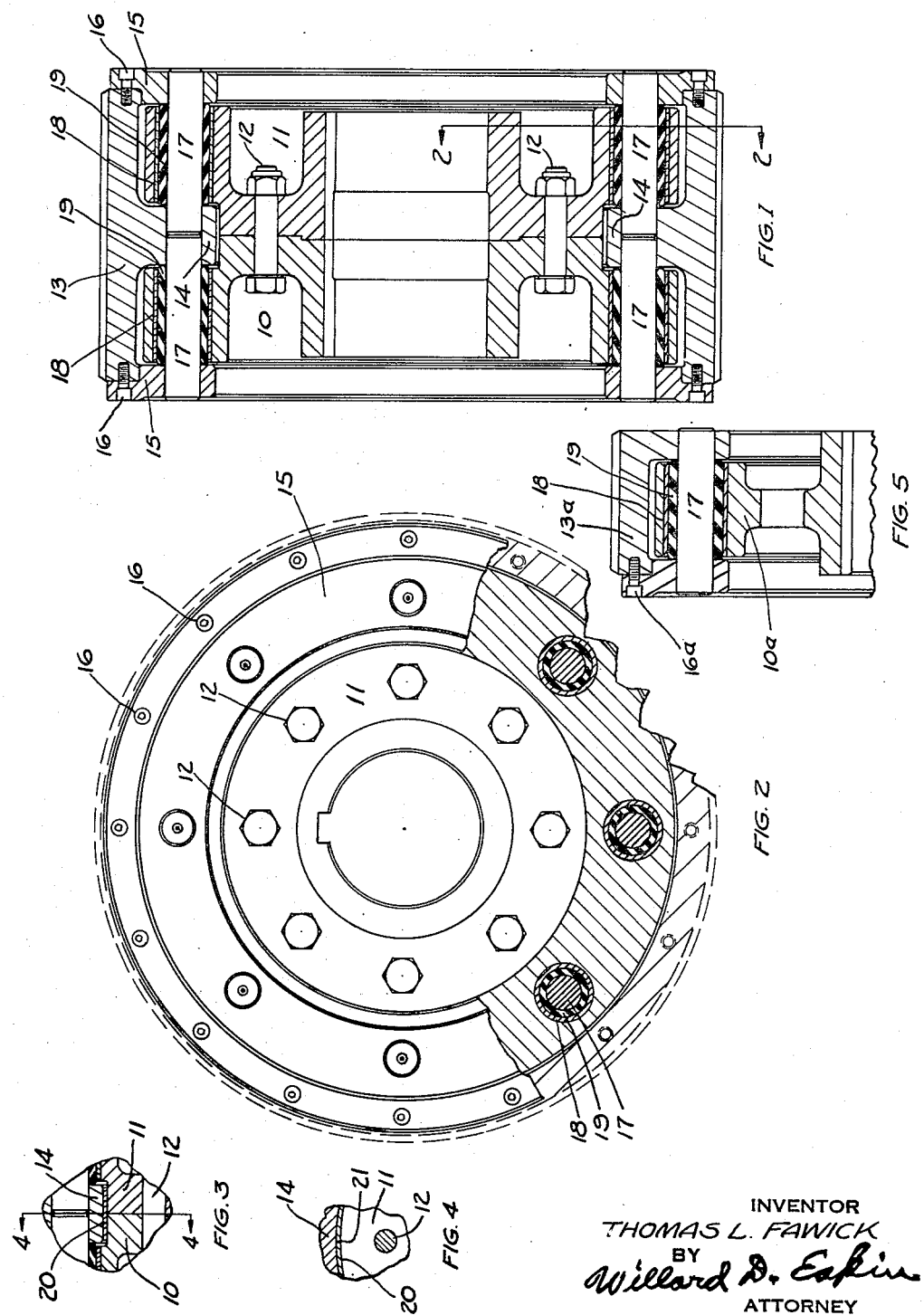
INVENTOR
THOMAS L. FAWICK
BY
Willard D. Eakin
ATTORNEY Patented Feb. 1, 1949

2,460,630

UNITED STATES PATENT OFFICE 2,460,630

MULTICUSHIONED GEAR

Thomas L. Fawick, Akron, Ohio

Application April 12, 1945, Serial No. 587,892

8 Claims. (Cl. 74—411)

This invention relates to a gear or the like having cushioning means interposed between its toothed portion, in the case of a gear, and its hub or other part which engages the machine part on which it is mounted.

Its chief objects are to provide desirable cushioning of the torque; to provide desirable radial cushioning; to provide a desirable flexible-coupling effect; to provide a gear in which the toothed portion is so cushioned as to provide substantial uniformity of load throughout the length of the tooth, even though the teeth be long, in spite of substantial shaft misalignment or inaccuracies in the shape or in the centering of the teeth; to provide such cushioning of the toothed portion of the gear as to permit it to adjust itself to an imperfectly positioned gear intermeshed with it; to provide a quietly running gear; to provide a rotary assembly having stability against side-sway under radial load; and to provide simplicity and economy of construction, assembly, disassembly and repair.

Of the accompanying drawings:

Fig. 1 is an axial section of a gear embodying my invention in its preferred form.

Fig. 2 is an end elevation of the same with a part sectioned on line 2—2 of Fig. 1 and broken away.

Fig. 3 is a fragmentary section, on an axial plane, of a modification.

Fig. 4 is a section on line 4—4 of Fig. 3.

Fig. 5 is a fragmentary axial section of a modification.

Referring to the drawings, the embodiment shown in Figs. 1 and 2 comprises a pair of axially abutting hub members 10, 11 secured together by bolts 12, 12, an externally toothed member 13 formed at the middle of its inner periphery with an inwardly projecting annular web or series of lugs 14, and a pair of annular, inwardly projecting side plates or rings 15, 15 secured to the respective annular sides of the toothed member 13 by screws 16, 16.

The web 14 of the toothed member 13, the side rings 15, 15, and the hub members 10, 11 are formed with a circumferential series of sets of aligned holes for the reception, permissibly but not necessarily with an easy sliding fit, of the pins 17, 17 of a series of pairs of cushioning assemblies each comprising a pin 17, a metal shell 18 surrounding and spaced from the pin, and a cushioning rubber bushing 19 mounted, preferably under radial compression, between the two.

Preferably the rubber bushings are first adhered to the pins by vulcanization and then forced into the metal shells to provide the radial compression, in procedure well known in the art, and thereafter, if it is found to be desirable, the outer face of the metal shell 19 can be ground, with light pressure, to make it accurately concentric with the pin 17, and of proper diameter to fit in the holes in the hub members, as by mounting the bushing assembly in a lathe, or by centerless grinding, in accordance with procedure described and claimed in my copending applications Ser. No. 590,692, filed April 27, 1945, and Ser. No. 686,013, filed July 24, 1946.

The parts preferably are so proportioned, as shown, that, with the pins 17 of each pair abutting or almost abutting each other at the middle plane of the web 14, the rubber bushing 19, projecting a little at each end of the metal shell 18, contacts the web 14 and the side ring 15, permissibly under substantial compression in an axial direction under the force of the screws 16, the bushing assembly and its parts thus being yieldingly held in functional relationship to the adjacent parts without metal-to-metal contact between the inner rigid structure comprising the hub members 10, 11 and outer rigid structure comprising the toothed member 13 and the side rings 15, 15, and, permissibly, without reliance upon a frictional fit of the pins in the outer rigid structure or of the shells 18 in the inner rigid structure.

Those two structures are, so to speak, interlinked with each other at the position of each bushing assembly but are completely insulated from each other by the rubber bushings.

The accurate finishing of the metal shells 18 after their assembly with the pins 17 and the rubber bushings, together with accurate positioning and sizing and shaping of the holes for reception of the ends of the pins, permits the production of a gear having the set of teeth, when not externally loaded, accurately concentric with the hub structure in spite of such slight off-centering of the shells 18 as may result from the forcing of the pins and rubber bushings into them, and the cushioning action of the rubber bushings, in service, starts from a condition of true concentricity of the set of teeth with the axis of the gear.

In assemblies in which such concentricity and cushioning of the torque are of major importance and flexible-coupling effect is of minor importance, or where it is important to maintain such concentricity in spite of torque or other external force upon the gear teeth, resort can readily be had to the modification illustrated in Figs. 3 and 4, in which a strip of sheet-metal 20 is bent to circular form and its ends abutted or approximately abutted as at 21 in Fig. 4, the strip then being mounted within the web 14 of the toothed member and the strip being of such thickness as to center the hub members with relation to the toothed member when the hub members are brought together within it as illustrated in Fig. 3.

Even though a radial-compression rubber bushing can not be of very great length if the radial compression is to be substantially uniform throughout the length of the bushing, whether the radial compression be obtained by axial clamping or by axial recoil of the rubber, or is imposed by the torque load, yet the construction illustrated in Fig. 1, comprising a plurality of axially spaced sets of the bushing assemblies, provides for the cushioning of long gear teeth with substantially uniform radial compression of all of the cushioning material.

Fig. 5 shows a modification in which a single set of cushioning assemblies, like those shown in Fig. 1, and designated by the same numerals, is mounted between a hub member 10a and an associated structure comprising a toothed member 13a and a side-ring secured to it by screws such as the screw 16a.

Each of the embodiments as described provides some or all of the advantages that are set out in the above statement of objects, and further modifications are possible within the scope of the appended claims.

I claim:

1. A gear comprising a structure adapted to be engaged with a mounting for the gear, a structure having gear teeth, the two overlapping each other radially of the assembly and overlapped portions of one of them being formed with a circumferentially spaced set of cushion-sockets, a set of axially disposed pins slidably mounted on the other structure, extending axially into said sockets respectively and each, with the wall of its socket, defining an annular space, and a cushion member, having substantially the resilient deformability of vulcanized soft-rubber, held under radial compression in each of the annular spaces, and having such clearance between adjacent parts as to be free to cushion said structures in all directions of relative movement, said members constituting substantially the only cushioning between said structures and one of the structures having contact pressure against said members which is chiefly radial with relation to the respective pins, the cushion members, at their ends, contacting the structure on which the pins are mounted, to resist lengthwise movement of the pins in said structure.

2. A gear comprising a structure adapted to be engaged with a mounting for the gear, a structure having gear teeth, the two overlapping each other radially of the assembly and overlapped portions of one of them being formed with a circumferentially spaced set of cushion-sockets, a set of axially disposed pins slidably mounted on the other structure, extending axially into said sockets respectively and each, with the wall of its socket, defining an annular space, and a cushion member, having substantially the resilient deformability of vulcanized soft-rubber held under radial compression in each of the annular spaces, and having such clearances between adjacent parts as to be free to cushion said structures in all directions of relative movement, said members constituting substantially the only cushioning between said structures, and one of the structures having contact pressure against said members which is chiefly radial with relation to the respective pins, and each of said members being held under radial compression in substantial measure by its own inherent recoil from an axially elongated condition of stress.

3. A gear comprising a structure adapted to be engaged with a mounting for the gear, a structure having gear teeth, the two overlapping each other radially and overlapped portions of one of them being formed with two axially spaced apart sets of circumferentially spaced cushion sockets, two sets of axially disposed pins on the other structure, extending axially into said sockets and each, with the wall of its socket, defining an annular space, and, in each of the annular spaces, a torque-cushioning member having substantially the resilient deformability of vulcanized soft-rubber, the teeth having such axial extent that they axially overlap torque-cushioning members of both sets.

4. A gear comprising a structure adapted to be engaged with a mounting for the gear, a structure having gear teeth, the two overlapping each other radially and overlapped portions of one of them being formed with two axially spaced apart sets of circumferentially spaced cushion sockets, two sets of axially disposed pins on the other structure, extending axially into said sockets and each, with the wall of its socket, defining an annular space, and, in each of the annular spaces, a torque-cushioning member having substantially the resilient deformability of vulcanized soft-rubber, the sockets and pins of each set being axially aligned with those of the other set respectively, and the teeth having such axial extent that they axially overlap torque-cushioning members of both sets.

5. A gear comprising a structure adapted to be engaged with a mounting for the gear, a structure having gear teeth, one of the structures having a radially projecting medial portion and two removable end portions axially aligned with and spaced from said medial portion, and the other structure having two radially projecting portions of which each extends between the said medial portion and one of said removable end portions and is there formed with an axial, through-aperture providing a cushion socket, a torque-cushioning member mounted in each of said sockets and having substantially the resilient deformability of vulcanized soft-rubber, and torque-transmitting means extending through said cushions and having torque-transmitting relations to said medial portion and said removable end portions, the teeth having such axial extent that they axially overlap torque-cushioning members of both sets.

6. A gear comprising a structure adapted to be engaged with a mounting for the gear, a structure having gear teeth, the two structures being interlinked with each other at two axially spaced apart sets of circumferentially spaced positions, and, at each of said positions, a cushion having substantially the resilient deformability of vulcanized soft-rubber holding the two structures out of contact with each other, the teeth having such axial extent that they axially overlap cushions of both of the sets.

7. A gear comprising a structure adapted to be engaged with a mounting for the gear, a structure having gear teeth, and, at each position of two axially spaced apart sets of circumferentially spaced positions, a pin rigid with one of the structures and a cushioning member surrounding the pin and mounted in a socket formed in the other member and having substantially the resilient deformability of vulcanized soft rubber, the said cushioning member being held under radial compression in substantial measure by its own inherent recoil from an elongated condition of stress, and the teeth being of such axial extent that they axially overlap cushioning members of both of the sets.

8. A gear comprising a structure adapted to be engaged with a mounting for the gear, a structure having gear teeth, and, at each position of two axially spaced apart sets of circumferentially spaced positions, a pin rigid with one of the structures and a cushioning member surrounding the pin and mounted in a socket formed in the other member and having substantially the resilient deformability of vulcanized soft rubber, the said cushioning member being held under radial compression in substantial measure by its own inherent recoil from an elongated condition of stress, the said pins being axially disposed, each of the said structures comprising a plurality of axially separable annular parts and means for holding them in assembled relation, and the teeth being of such axial extent that they axially overlap cushioning members of both sets.

THOMAS L. FAWICK.

REFERENCES CITED

The following references are of record in the file of this patent:

UNITED STATES PATENTS

| Number | Name | Date |
|---|---|---|
| 379,022 | Morgan | Mar. 6, 1888 |
| 427,103 | Morgan | May 6, 1890 |
| 1,541,276 | Powell | June 9, 1925 |
| 1,804,906 | Wemp | May 12, 1931 |
| 2,154,385 | Riesing | Apr. 11, 1939 |

FOREIGN PATENTS

| Number | Country | Date |
|---|---|---|
| 254,671 | Italy | Aug. 22, 1927 |
| 408,724 | Great Britain | 1934 |
| 421,798 | Great Britain | 1933 |